(12) United States Patent  (10) Patent No.: US 10,502,081 B2
Bioud et al.  (45) Date of Patent: Dec. 10, 2019

(54) TURBOMACHINE BEARING HOUSING

(71) Applicant: SNECMA, Paris (FR)

(72) Inventors: Jérémy Lucien Jacques Bioud, Moissy-Cramayel (FR); Sébastien Bourget, Moissy-Cramayel (FR); Gaël Evain, Moissy-Cramayel (FR); Eddy Stéphane Joël Fontanel, Moissy-Cramayel (FR); Florence Irène Noëlle Leutard, Moissy-Cramayel (FR); Christophe Lima, Moissy-Cramayel (FR); Giuliana Elisa Rossi, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 653 days.

(21) Appl. No.: 15/110,905

(22) PCT Filed: Jan. 15, 2015

(86) PCT No.: PCT/FR2015/050102
§ 371 (c)(1),
(2) Date: Jul. 11, 2016

(87) PCT Pub. No.: WO2015/110744
PCT Pub. Date: Jul. 30, 2015

(65) Prior Publication Data
US 2016/0341059 A1 Nov. 24, 2016

(30) Foreign Application Priority Data
Jan. 23, 2014 (FR) ...................................... 14 50570

(51) Int. Cl.
*F01D 9/02* (2006.01)
*F01D 11/04* (2006.01)
(Continued)

(52) U.S. Cl.
CPC ............... *F01D 11/04* (2013.01); *F01D 9/02* (2013.01); *F01D 25/162* (2013.01);
(Continued)

(58) Field of Classification Search
CPC .......... F01D 9/02; F01D 11/04; F01D 25/162; F01D 25/18; F01D 25/183; F02C 7/06;
(Continued)

(56) References Cited

U.S. PATENT DOCUMENTS 4,542,623 A * 9/1985 Hovan .................. F01D 25/125
165/51
4,989,886 A * 2/1991 Rulis ...................... F01D 11/00
277/355

(Continued)

FOREIGN PATENT DOCUMENTS

| EP | 1 055 848 A1 | 11/2000 |
| EP | 1 316 678 A2 | 6/2003 |
| FR | 2 952 402 A1 | 5/2011 |

OTHER PUBLICATIONS

Written Opinion of the International Searching Authority dated Apr. 14, 2015, issued in corresponding International Application No. PCT/FR2015/050102, filed Jan. 15, 2015, 6 pages.

(Continued)

*Primary Examiner* — Woody A Lee, Jr.
*Assistant Examiner* — Christopher R Legendre
(74) *Attorney, Agent, or Firm* — Christensen O'Connor Johnson Kindness PLLC

(57) ABSTRACT

A turbomachine bearing housing comprising a fixed wall, a rotating shaft, first and second seals between the wall and the shaft, and a chamber between the fixed wall and a stator element supplied with air via an opening close to the shaft. An air guide is arranged along the surface of the wall of the housing, outside same, such that at least a portion of the air (Continued)

exiting the guide passes between the first seal and the shaft, the air guide being supplied with air by an air intake separated radially from the shaft, the air from the air intake being at a higher pressure than at the shaft.

12 Claims, 3 Drawing Sheets

(51) Int. Cl.
*F01D 25/16* (2006.01)
*F01D 25/18* (2006.01)
*F02C 7/06* (2006.01)

(52) U.S. Cl.
CPC .............. *F01D 25/183* (2013.01); *F02C 7/06* (2013.01); *F05D 2220/32* (2013.01); *F05D 2240/12* (2013.01); *F05D 2240/50* (2013.01); *F05D 2240/55* (2013.01); *F05D 2240/60* (2013.01); *F05D 2240/80* (2013.01); *F05D 2250/283* (2013.01)

(58) Field of Classification Search
CPC ............. F05D 2240/12; F05D 2240/50; F05D 2240/55
See application file for complete search history.

(56) References Cited

U.S. PATENT DOCUMENTS

| | | | | |
|---|---|---|---|---|
| 7,934,901 | B2* | 5/2011 | Moniz | F01D 5/066 |
| | | | | 415/115 |
| 9,353,647 | B2* | 5/2016 | Bordne | F01D 25/18 |
| 9,410,429 | B2* | 8/2016 | Watson | F01D 5/026 |
| 2006/0123795 | A1* | 6/2006 | Fish | F01D 11/04 |
| | | | | 60/772 |
| 2013/0280043 | A1 | 10/2013 | Parnin et al. | |
| 2016/0341059 | A1* | 11/2016 | Bioud | F01D 11/04 |

OTHER PUBLICATIONS

International Preliminary Report on Patentability dated Jul. 26, 2016, issued in corresponding International Application No. PCT/FR2015/050102, filed Jan. 15, 2015, 1 page.

International Search Report dated Apr. 14, 2015, issued in corresponding International Application No. PCT/FR2015/050102, filed Jan. 15, 2015, 2 pages.

* cited by examiner

TURBOMACHINE BEARING HOUSING

FIELD OF THE DISCLOSURE

The field of the present disclosure is that of turbine engines, in particular that of gas turbine engines which are intended for the propulsion of aircraft. Embodiments of the present disclosure relate to the balance of the pressures at the limits of the sealing members between the rotating elements and the fixed elements of the turbine engine, in particular, in the region of the bearings supporting the shafts of the rotors, and to the sealing of the enclosures in which the bearings are received.

BACKGROUND

A turbine engine for an aircraft generally comprises, from upstream to downstream in the direction of flow of the gases, a fan, one or more compressor stages, for example a low-pressure, LP, compressor, and a high-pressure, HP, compressor, a combustion chamber, one or more turbine stages, for example a high-pressure turbine and a low-pressure turbine, and a gas exhaust pipe. A turbine can correspond to each compressor, the two being connected by a shaft, thus forming, for example, a high-pressure, HP, body and a low-pressure, LP, body.

The shafts are supported upstream and downstream by bearings which are received in enclosures which shield them from the rest of the engine. The enclosures thus contain roller bearings which are interposed between a rotating member of the engine and a fixed part which supports the member, or else between two rotating parts, the two parts rotating at different rotational speeds, such as a pivot pin which is rigidly connected to the HP shaft and the LP shaft. The bearings are lubricated and cooled by oil. The oil, which is sprayed by the rotating parts, forms a mist of suspended droplets there. These enclosures are formed and delimited by walls of the fixed structure of the engine but also by the rotating elements. Sealing means are provided in the regions where the fixed and movable parts join together. The means must allow the passage of an air flow therethrough, for the purpose of pressurizing the enclosure and retaining as much oil as possible within the enclosure. This is why the sealing between the fixed and rotating elements of an oil enclosure is a particularly tricky problem.

The sealing is commonly achieved by using a labyrinth seal, which is the simplest, strongest and most widespread sealing solution for turbine engines. Such a seal comprises, firstly, knife-edge seals, or thin ribs, which are rigidly connected to a rotating part and, secondly, an abradable material, positioned opposite the knife-edge seals, which is rigidly connected to a fixed part. Since in this case a roller bearing is nearby, a clearance is imposed between the knife-edge seals and the abradable material so that the knife-edge seals do not hollow out the abradable material and do not create chips with the material which forms the abradable material: the roller bearings are sensitive to the metal particles which may damage them. Each knife-edge seal creates a loss of pressure in cooperation with the abradable material which faces the seal, and it is the sum of these pressure losses which ensures the required sealing. Other sealing techniques are also possible, such as brush seals, as described in the patent application in the name of the applicant, FR 1261694, in which a labyrinth seal is associated with a brush seal in order to control the rates of flow of leaks through the seal irrespective of the engine speed. The patent application FR 2 929 325 in the name of the applicant relates to a bearing enclosure, of which the rate of flow of leaks can be checked by checking the pressure inside the enclosure likewise according to the speed. In this application, seals of the segmented radial type are mentioned. The application of this type of seal to a turbine engine is described in the patent in the name of the applicant EP 387,122.

A bearing enclosure generally comprises two seals along the shaft, one upstream of the bearing which is contained in the enclosure, the other downstream of the bearings. However, some bearing enclosures can comprise one or more additional seals, and the enclosure itself can comprise a plurality of bearings. As indicated above, these seals are passed through by a gas flow from the outside of the seals towards the inside of the enclosure in order to prevent, during the operation of the engine, oil contained in the enclosure from escaping and polluting the other members of the engine. This gas is air originating from a source of pressurized air, in particular compressors.

The enclosure can be in communication with the open air and kept at a pressure which is close to atmospheric pressure. The bearings inside the enclosures are bathed in a mist of oil which is continuously extracted from the enclosure and separated in an oil separator.

The enclosure can also not be in direct communication with the open air and not comprise oil separation. A pump for recovering oil which is connected to a recovery port, which is located at 6 o'clock, at the low point of the engine, recovers the oil and the air from the enclosure and thus creates an intake of air through the seals of the oil enclosure. The pump advantageously has a pumping rate which is greater than the rate of flow of oil into the enclosure which allows the lubrication of the bearing. In this case, it is important to have an air flow through the two upstream and downstream seals, in order to retain the oil in the region of the two seals. And, so that there are air flows passing through the two seals of the oil enclosure, it is necessary to have a balance of pressure upstream of the two seals. By means of this balance of pressure, no preferred route is created which would favor one seal over the other and would thus compromise the sealing performance of the latter seal.

The present disclosure aims to solve the problem of balancing the pressures outside the two seals of the enclosure by increasing the pressure upstream of the seal, the pressure level of which is the lower of the two.

According to a known arrangement, the air which is dedicated to pressurizing the seals, which comes from the compressors, enters the chamber in which the bearing enclosure is located through an opening which is located close to the shaft, then is guided along the outer surface of the bearing enclosure radially then axially through suitable passages as far as the downstream chamber in order to supply the downstream seal. The analysis of the pressure levels of this pressurizing air flow shows that there is a pressure gradient between the air inlet opening and the region which is located at a higher radial level. This pressure gradient results from the recompression vortex in this chamber which is located upstream of the upstream seal of the bearing enclosure. The expression "recompression vortex" denotes the phenomenon which links the radial gap to a difference in pressure when a rotating flow is present. In this case, the flow becomes a rotating flow because it is driven by the rotation of the shaft of the turbine engine. As the pressurizing air flow coming from the compressor is introduced into the chamber through an opening which is located radially in the region of the shaft, the rotation of the shaft causes the rotation of this air flow which swirls radially as far as an annular discharge duct which is located at a greater radius than that of the opening for entry into the chamber. This swirling movement creates a radial pressure gradient on the ventilation air flow.

SUMMARY

The present disclosure makes use of this pressure gradient to recover air at a higher pressure than in the region of the seal in order to precisely ensure a sufficient pressure level upstream of a first seal and a balance between the pressures outside the two seals of the enclosure. A sufficient of flow of air through the two seals to prevent any leaks of oil is thus ensured.

In accordance with the disclosure, a bearing enclosure of a turbine engine, comprising a fixed wall, a rotating shaft, a first and a second seal between the wall and the shaft, and a chamber between the fixed wall and a stator element is characterized in that a means for guiding air is arranged along a portion of the surface of the fixed wall of the enclosure on the outside thereof, in such a way that at least some of the air leaving the guide means passes through the first seal, the guide means being supplied with air through an air intake in the chamber, which is radially remote from the shaft, the air from the air intake being at a higher pressure than in the region of the shaft.

Thus, the means for controlling the pressure in the region of the first seal is given in such a way that the respective pressures in the region of the two seals are balanced.

According to one advantageous embodiment, insofar as the wall of the bearing enclosure comprises a radially oriented portion, the guide means comprises a guide plate, for example in the form of a simple sheet, which is arranged radially in parallel with the wall portion of the enclosure. More particularly, since the first seal is supported by a plate which is fixed to a flange of the enclosure, and since the wall portion of the enclosure is formed by the support, the guide plate is attached to the wall of the enclosure and bolted with the support of the seal to the flange, for example.

Preferably, the guide plate in the form of a sheet defines a small clearance with the shaft. This is to prevent too much of the air guided between the plate and the wall of the enclosure from returning to the upstream chamber. The air is intended to pass through the seal in the region of the shaft.

The recovery of pressure along the wall of the bearing enclosure is further improved using a guide means comprising a device which is arranged to guide the air flow radially with—at the output of the device—a tangential speed component which is low in relation to the radial component. By reducing the rotation of the air, the loss of pressure along the guide means is reduced.

The tangential speed component of this air flow is advantageously reduced by arranging a ring which is perforated by radial orifices, in particular having an oblong shape, or which comprises fins which orient the flow radially or else a ring in a honeycomb structure.

The disclosure applies in particular to an enclosure of which the first seal is a segmented radial seal. This type of seal is very effective. The second seal can be a labyrinth seal.

The solution from the disclosure applies in particular in the case in which the radially remote air intake corresponds to a region of vortex compression.

Lastly, the disclosure relates more particularly to a turbine engine comprising a bearing enclosure according to the disclosure having an annular chamber upstream of the bearing enclosure. The chamber is supplied with air through a supply opening which is close to the shaft and comprises an air discharge opening, in the form of an annular duct, which is radially remote from the shaft. There is thus a radial gap between the air supply opening of the upstream chamber and the air discharge opening thereof. The air intake of the means for guiding the air for pressurizing the first seal, which is radially remote, is arranged in proximity to the air discharge opening.

The turbine engine also comprises an annular chamber downstream of the bearing enclosure, which is supplied with air for pressurizing the second seal from the discharge opening of the upstream annular chamber. Some of the air for pressurizing the seal passes into the bearing enclosure through the second seal.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
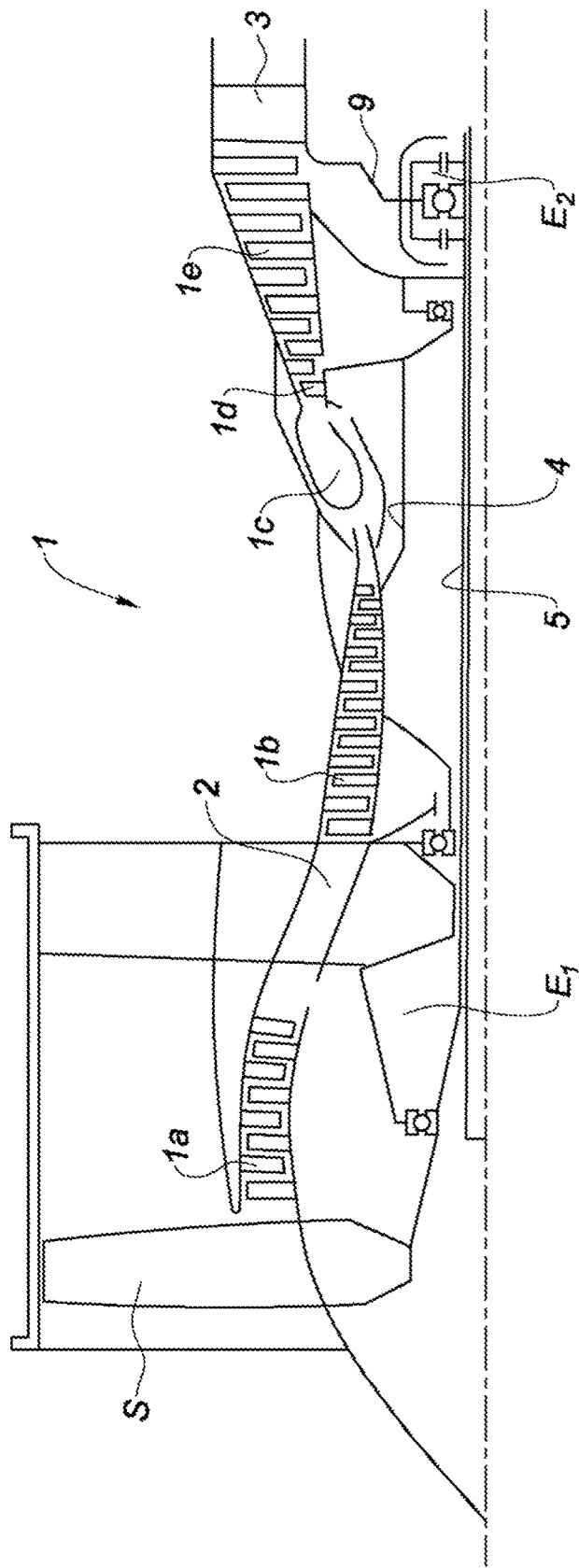
FIG. 1 is a schematic axial half-sectional view of a bypass turbojet engine, according to the prior art.

With reference to FIG. 1, a turbojet engine 1 from the prior art can be seen, which conventionally comprises a fan S, a low-pressure LP compressor 1a, a high-pressure HP compressor 1b, a combustion chamber 1c, a high-pressure HP turbine 1d and a low-pressure LP turbine 1e. The high-pressure compressor 1b and the high-pressure turbine 1d are connected by a high-pressure shaft 4 and they and the shaft together form a high-pressure HP body. The low-pressure compressor 1a and the low-pressure turbine 1e are connected by a low-pressure shaft 5 and they and the shaft together form a low-pressure LP body. These bodies are carried by fixed structural parts, referred to as intermediate case 2, for supporting the roller bearings thereof which are located upstream, and exhaust case 3, for supporting the roller bearings thereof which are located downstream.

To ensure the lubrication thereof, these roller bearings are enclosed in enclosures which are almost fluid-tight and are formed by juxtaposing fixed walls, which are connected to the intermediate case 2 and to the exhaust case 3 respectively, and movable elements which are connected to the high-pressure and low-pressure shafts respectively. Thus, a turbine engine generally comprises an upstream enclosure E1 associated with the intermediate case 2 and a downstream enclosure E2 associated with the exhaust case 3. As stated previously, these enclosures are bathed in an atmosphere containing oil for lubricating the various members, and an air flow passes therethrough, at a controlled rate of flow, for pressurization purposes.

Figure 2:
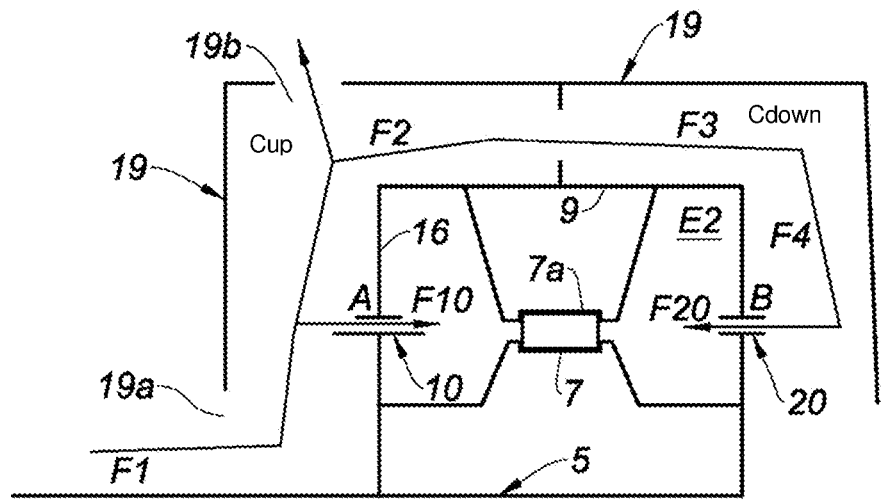
FIG. 2 is a schematic axial sectional view of a bearing enclosure according to the prior art.

FIG. 2 shows a bearing in the enclosure thereof according to an arrangement from the prior art. In this case, it is the rear bearing which is associated with the exhaust case and the enclosure E2 thereof.

The downstream end of the LP shaft 5 is supported by a roller bearing 7, the fixed ring 7a of which is mounted in a bearing support 9 which is rigidly connected to the exhaust case of the engine. The roller bearing is bathed in a mist of oil which is produced by means which are not shown. The bearing support 9 is designed so as to provide, together with the shaft, an enclosure E2 which encases the bearing 7. The bearing support 9 forms a fixed wall. Upstream of the bearing, a first seal 10 ensures the sealing between the fixed wall of the bearing support 9 and the shaft 5. Downstream of the bearing 7, a second seal 20 ensures the sealing between the support and the shaft 5. In this case, the first seal is a segmented radial seal, and the second seal is a labyrinth seal. The bearing support 9 comprises a wall portion 16 upstream which extends perpendicularly to the shaft 5.

The second, labyrinth seal 20 comprises knife-edge seals which cooperate with an element made of abradable material. A twist such as for the first seal leads the oil which tends to accumulate against the seal back towards the enclosure.

The arrows indicate the circulation of the air for pressurizing the seals. The air F1 from the compressors enters through an opening 19a which is close to the shaft 5 in the chamber Cup which is formed between the upstream wall of the enclosure E2 and a stator element 19 such as a sheet. This air swirls inside the chamber as a result of the rotation of the shaft 5. The air undergoes a vortex compression, or a recompression vortex, and is discharged in part in F2 through the discharge opening 19b, which is remote from the shaft and is formed by the annular duct which is provided between the enclosure E2 and the stator element 19. The pressure is determined in such a way that some F10 of the air in the chamber Cup passes through the first seal 10 into the bearing enclosure so as to prevent any oil from leaking through the seal. The air F2 follows a route F3 then F4 into the downstream chamber Cdown on the side of the second, bearing seal 20. Some F20 of the air passes through the seal 20. The pressure of the air increases from F1 to F2, as indicated above, then decreases in F3 to F4 as a result of the pressure losses in the circuit between the two chambers Cup and Cdown. It is noted that in this configuration, the pressure in A just upstream of the first seal 10 remains less than the pressure in B just at the inlet of the second seal despite the pressure losses in F3 and F4.

The pressure in B is at a level which is sufficient in relation to the pressure prevailing inside the enclosure to prevent the oil from leaking through the labyrinth seal 20.

However, the lack of pressure in A is liable to cause a leak of oil through the seal 10.

In light of the observation that there is a pressure gradient between the input in F1 and the output of the upstream chamber Cup in F2, a means for guiding the air for pressurizing the seal between the region of pressure F2 and the inlet A of the seal 10 has been added in accordance with the disclosure.

Figure 3:
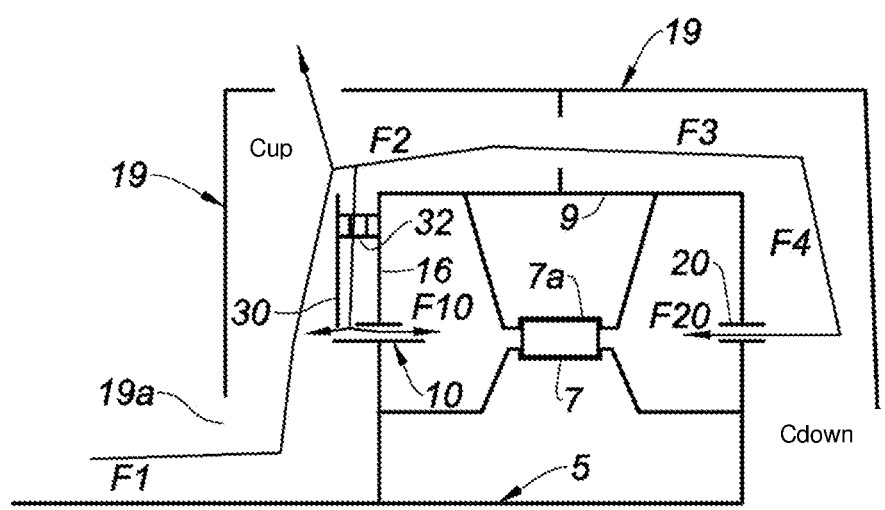
FIG. 3 shows the bearing enclosure from FIG. 2, in which the device from the disclosure has been mounted.

FIG. 3 shows the arrangement from the disclosure. A sheet 30 has been mounted, with a spacer 32 interposed, on the wall portion 16 of the bearing support 9. This sheet 30 defines a passage forming the means for guiding air which extends radially between the shaft 5 and the annular output duct 19b of the chamber Cup. A small clearance is present between the shaft 5 and the sheet 30. As a result of this arrangement, the air in this passage is at the pressure which prevails in F2 close to the loss of pressure, and a centripetal air flow is created in the passage which passes through the seal 10 and the clearance as a result of the lower level of pressure in F1 and in the bearing enclosure. As a result of ensuring that the clearance is reduced as much as possible, an air flow passes through the seal 10.

In addition to the increase in pressure upstream of the first seal, the sheet also has the advantage of eliminating variations in pressure which can occur in the chamber Cup at all radial heights. These undesirable variations in pressure can be caused by the shape of the case and by the force of the vortex. The pressure achieved upstream of the seal is only slightly subjected to the variations in the environment thereof by this means.

The recovery of pressure is improved further by correcting the centripetal air flow. This is made possible by correcting means which cancel out or at least reduce the tangential speed component of the centripetal air flow. These flow-correcting means are for example orifices which are suitably oriented, for example having an oblong shape, which are made in the spacer 32. Instead of orifices, radial fins or any other means can be provided, for example a ring in a honeycomb structure.

Figure 4:
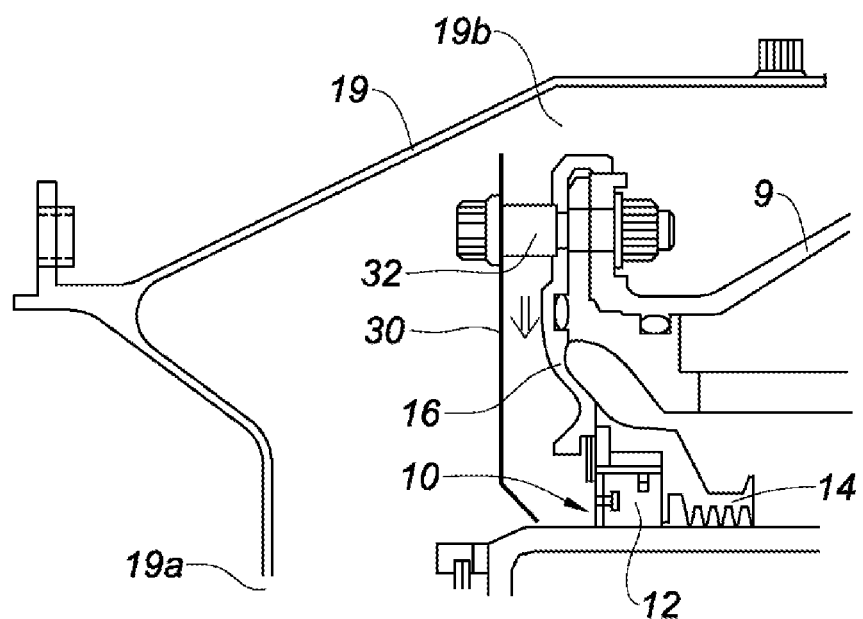
FIG. 4 shows an example of mounting the device from the disclosure.

FIG. 4 shows an example of mounting which is carried out with a segmented radial seal. The seal 10 comprises, according to an embodiment as described in EP 387122, a segmented ring 12 which is for example made of graphite, the segments of which are rigidly connected by means of a resilient ring and are received in a groove in an annular seal support plate 16. The segments are supported against an annular track which is made on the surface of the shaft. The seal support plate 16 forms the upstream portion of the bearing enclosure. The seal support plate 16 extends in a plane which is transverse with respect to the shaft, and is bolted to an upstream flange 18 of the bearing support 9. As is also known, a twist 14 is arranged downstream of the seal, the function of which is to collect the oil which accumulates against the seal and to guide it towards the enclosure.

By way of the solution from the disclosure, the pressure generated by the swirling movement of the air is recovered to adjust the pressure at the inlet of the first seal. This pressure is adjusted so as to reduce and even almost cancel out the difference in pressure with the inlet of the second seal downstream and thus balance the pressures at the limits of the bearing enclosure.

This solution is advantageously robust because the balance of the pressures is not dependent on the force of the vortex but rather only on the pressure losses of the path between the two upstream and downstream chambers. It is thus possible to adjust the pressure losses of the guide device and thus balance the pressures almost perfectly.

The disclosure has been described for the case in which the pressure level is to be adjusted immediately upstream of the upstream seal of the bearing enclosure of the low-pressure shaft of a twin-spool engine. However, the disclosure is not limited to this application. It can be transposed to all cases in which it is necessary to adjust the pressure in the region of a seal of a bearing enclosure and in which there is a source of pressure nearby, in particular resulting from a recompression vortex.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A bearing enclosure of a turbine engine, comprising:
   a fixed wall;
   a rotating shaft;
   a first seal and a second seal between the fixed wall and the rotating shaft;
   a stator element disposed around the rotating shaft and comprising a first opening positioned adjacent the rotating shaft;
   a first chamber disposed between the fixed wall and the stator element, the first chamber being supplied with intake air through the first opening;
   an air guide arranged along an external surface of the fixed wall, the air guide defining a pathway supplied with intake air through an orifice positioned in the first chamber in such a way that at least some of the intake air supplied to the orifice exits the air guide through the first seal,
   wherein the orifice is arranged at a first distance radially outwardly from the rotating shaft and the first opening so that the intake air supplying the pathway is at a higher pressure than the intake air passing through the first opening.

2. The enclosure according to claim 1, wherein the air guide comprises a plate which is arranged radially along and at a distance from the fixed wall.

3. The enclosure according to claim 2, wherein a clearance is provided between the plate and the rotating shaft.

4. The enclosure according to claim 1, wherein a spacer is disposed between the air guide and a wall portion upstream to the fixed wall, the spacer extending perpendicularly to the rotating shaft, the spacer being in the form of a ring which is perforated by radial holes, is provided with a honeycomb structure, or is provided with fins.

5. The enclosure according to claim 1, wherein the first seal is a segmented radial seal.

6. The enclosure according to claim 1, wherein the second seal is a labyrinth seal.

7. The enclosure according to claim 1, wherein the orifice is positioned in a vortex compression portion of the first chamber.

8. The enclosure according to claim 1, wherein the first opening is disposed in a lower portion of the first chamber, and the orifice is disposed in an upper portion of the first chamber.

9. The enclosure according to claim 1, wherein the pathway extends radially between the rotating shaft and an annular output duct, the annular output duct being disposed in an upper portion of the first chamber.

10. A turbine engine comprising:
    a bearing enclosure, the bearing enclosure including:
       a fixed wall;
       a rotating shaft;
       a first seal and a second seal between the fixed wall and the rotating shaft;
       a stator element disposed around the rotating shaft and comprising a first opening positioned adjacent the rotating shaft;
       a first chamber disposed between the fixed wall and the stator element, the first chamber being supplied with intake air through the first opening;
       an air guide arranged along an external surface of the fixed wall, the air guide defining a pathway supplied with intake air through an orifice positioned in the first chamber in such a way that at least some of the intake air supplied to the orifice exits the air guide through the first seal,
    wherein the orifice is arranged at a first distance radially outwardly from the rotating shaft and the first opening so that the intake air supplying the pathway is at a higher pressure than the intake air passing through the first opening, and
    wherein the first chamber being located upstream of the fixed wall, and having a second discharge opening which is arranged radially at a distance from the rotating shaft, said orifice being arranged at a second distance from said second discharge opening.

11. The turbine engine according to claim 10, comprising an annular, second chamber downstream of the fixed wall, which is supplied with intake air from the first chamber.

12. The turbine engine according to claim 10, wherein the second distance of the second discharge opening is radially farther from the rotating shaft than the orifice.

* * * * *